Nov. 14, 1950　　　W. W. CARRON　　　2,529,834
AIR VENT VALVE
Filed Jan. 11, 1947
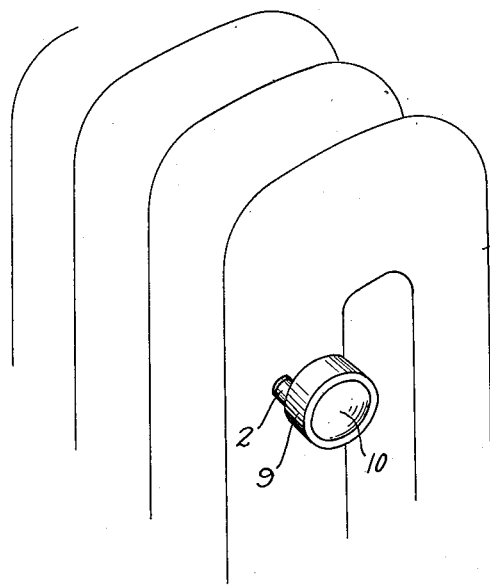
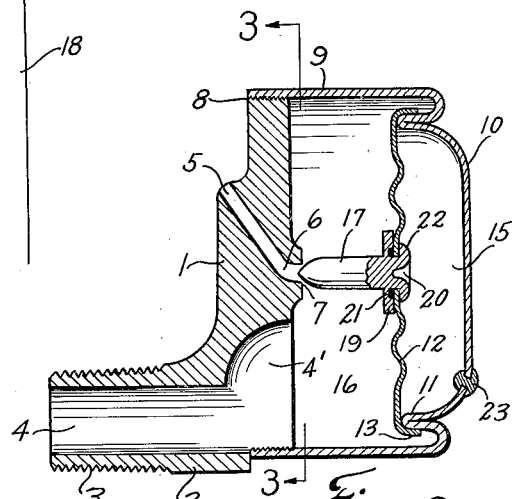
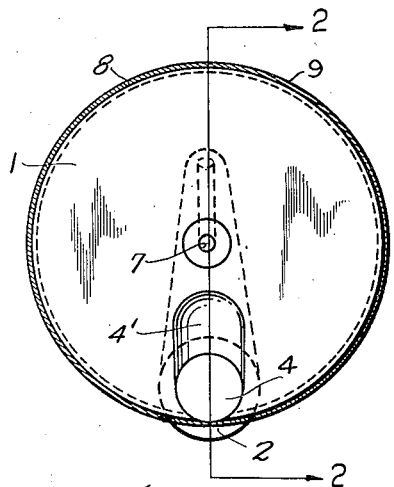
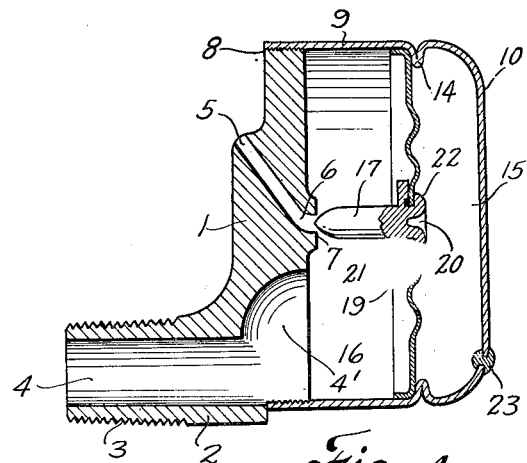
Inventor
William W. Carron
By F. L. Walker
Attorney Patented Nov. 14, 1950

2,529,834

UNITED STATES PATENT OFFICE 2,529,834

AIR VENT VALVE

William W. Carron, Chicago, Ill.

Application January 11, 1947, Serial No. 721,557

2 Claims. (Cl. 236—64)

This invention pertains to valves, and more particularly to automatic thermally controlled air vent valves for radiators of steam or vapor heating systems and other systems for circulation of heated medium.

When such systems are permitted to cool the heated circulating medium therein condenses and contracts and air is drawn into the system, which must be released therefrom and the escape vent closed before heated medium is again circulated in large quantity.

Heretofore various forms of pressure operated valves have been devised for this purpose. However the entrance of heated medium places the entrapped air under pressure sufficient to effect closure of the pressure operated vent valve before the heated medium reaches the vent point. Since complete circulation of the heated medium is the primary object, it has been found more practical and efficient to actuate the closing of the air vent valve by temperature increase instead of by pressure alone.

The object of the present invention is to simplify the construction as well as the means and mode of operation of automatic air vent valves, whereby they may not only be economically manufactured, but will be more efficient in use, automatic in operation, uniform in action, having relatively few operating parts, and be unlikely to get out of repair.

A further object of the invention is to provide an air vent valve of large capacity to enable quick venting or rapid elimination of air from a circulating system of heated medium.

A further object of the invention is to provide an air vent valve which will prevent the loss of heated medium by automatically closing the valve immediately, upon influence of increased temperature while more distantly located vent valves may remain open while awaiting the approach of heated medium.

A further object of the invention is to provide an automatic air vent valve wherein condensation and moisture will be automatically drained from the valve back to the system.

A further object of the invention is to provide an air vent valve which will not be subject to premature closing, and entrapment of greater or less quantity of cold air.

A further object of the invention is to minimize discharge of condensation and moisture through the vent valve.

A further object of the invention is to provide an air vent valve having an exhaust passage and outlet of maximum capacity offering minimum resistance to the escape of cold air, but quickly responsive to the influence of increased temperature to restrict the escape outlet.

A further object of the invention is to provide a thermally controlled air vent valve possessing the advantageous structural features, the inherent meritorious characteristics and the mode of operation as herein set forth, or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the accompanying drawings, wherein is illustrated the preferred, but not necessarily the only form of embodiment of the invention, Fig. 1 is a perspective view of an air valve of the present design mounted on a conventional type of steam or vapor radiator.

Fig. 2 is a vertical sectional view of an automatic air vent embodying the present invention on line 2—2 of Fig. 3.

Fig. 3 is a transverse sectional view on line 3—3 of Fig. 2 thereof.

Fig. 4 is a detail view illustrative of a modification.

Like parts are indicated by similar characters of reference throughout the several views.

Referring to the drawings, the present valve comprises a mounting head 1 preferably of cast or forged metal, having in approximate relation with the periphery thereof an integral tubular stem or spud 2 which is screw threaded at 3 for engagement in a radiator or other support. The interior of the head 1 is formed concave at 4' in such relation that the lower side of the bore 4 of the stem or spud 2 coincides with the periphery of the head 1 and affords no obstruction to free drainage of condensation or moisture from the valve housing through the bore of the stem.

The head 1 is provided with an upwardly inclined vent passage 5 to atmosphere, communicating with a centrally disposed port 6 surrounded by a valve seat 7. The periphery of the mounting head 1 is screw threaded at 8 to receive an internally screw threaded housing or shell 9. The housing or shell 9 is either drawn or spun from sheet metal. The shell or housing is closed at one end 10 and has formed therein an inwardly projecting concentric integral fold or plait 11.

Attached to the inwardly projecting fold or plait 11 of the housing 9 is a flexible diaphragm 12 having a peripheral rim 13 which fits over and is attached to the inwardly projecting fold 11 in a vertically disposed plane. While this is a preferable and economical method of mounting the diaphragm, the latter might be slightly increased in diameter to agree with the interior diameter of the housing or shell 9, into which the diaphragm may be pressed, and securely united to the interior of the housing wall. The latter may be formed with an inwardly projecting bead or rib 14, Fig. 4 to limit the insertion and locate the position of the diaphragm. In either form of construction, the flexible diaphragm 12 occupies a vertical plane dividing the housing 9 into two nonintercommunicating chambers whereby no condensation or moisture can collect upon the diaphragm and so dampen or retard its fluctuations under temperature changes.

In either event the flexible diaphragm forms a chamber 15 between the diaphragm and the end 10 of the housing, into which is admitted a charge of volatile fluid, expansible under influence of a temperature increase, and a main chamber 16.

Attached to the center of the flexible diaphragm 12 and movable axially by the fluctuations thereof is a valve member 17, which upon expansion of the gas or other volatile charge within the chamber 15 and resulting bulging of the flexible diaphragm 12, is projected horizontally into engagement with the valve seat 7 surrounding the vent port 6 to close the latter.

As the steam or vapor in the system approaches the valve, the cold air content of the radiator 13 is displaced therefrom through the bore 4 of the stem 2 into the main chamber 16 of the valve from which it escapes through the exhaust port 6 and passage 5. When the steam or vapor arrives at the exhaust point and follows the displaced air through the tubular stem 2 into the chamber 16 of the valve, the temperature of the steam or vapor is transferred through the flexible diaphragm to the expansive charge of expansive fluid within the chamber 15. As before indicated the expansion of the charge within the chamber 15 deflects the diaphragm to bodily move the valve 17 toward its valve seat 7 thus reducing the out flow of air and finally closing the vent port 6 to the escape of steam or vapor. The valve 17 preferably comprises a short tapered or rounded plunger having a peripheral collar or shoulder 19 against which the central area of the diaphragm abuts. The valve plunger 17 extends through the diaphragm and its inner end is counterbored at 20, whereby it may be expanded or flared, to afford a tight leak proof joint with the diaphragm. A bit of packing material 21 may be interposed between the diaphragm and either the collar or shoulder 19 or the flared end 22 of the valve. The housing head 10 is provided with a filling opening normally closed by a plug or rivet 23 which may be sealed in place by a bit of solder after the chamber 15 has received its charge of expansive fluid.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to stuctural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An air vent valve for a heating system, including a peripherally screw threaded mounting head, an integral tubular stem projecting from one side thereof with the outer side of its bore substantially coincident with the periphery of the head, a vent passage through said head, a valve seat surrounding the entrance orifice of the passage at the inner side of the head, an internally screw threaded cup shaped housing engageable with the screw threaded periphery of the head, a concentric inwardly projecting fold in the closed end of the cup shaped housing, a flexible diaphragm, a marginal flange thereon perpendicular to the plane of the diaphragm telescopically engaged over the inwardly projecting flange dividing the interior of the housing into two nonintercommunicating chambers, a body of thermally responsive expansible and contractable fluid confined in one of said chambers, a normally open valve member carried by the flexible diaphragm and projected into engagement with the valve seat surrounding the entrance to the vent passage upon deflection of the diaphragm incident to expansion of the confined charge of expansive fluid, the construction and arrangement being such that while the confined body of thermally responsive fluid is normally contracted, the valve member will be normally retracted away from its seat to maintain the vent passage open for escape of air entering the valve chamber through the tubular stem, and upon entrance of heated medium into said chamber and consequent expansion of said confined body of thermally responsive fluid, the deflection of the diaphragm incident thereto will close the vent passage to prevent the escape of heated steam or vapor by which the temperature of the confined body of thermally responsive material has been increased.

2. An air vent valve for a heating system, including a peripherally screw threaded mounting head, an integral tubular stem projecting from one side thereof with the outer side of its bore substantially coincident with the periphery of the head, a vent passage through said head, a valve seat surrounding the entrance orifice of the passage at the inner side of the head, an internally screw threaded cup shaped housing engageable with the screw threaded periphery of the head, a concentric inwardly projecting fold in the closed end of the cup shaped housing, a flexible diaphragm, a marginal flange thereon perpendicular to the plane of the diaphragm engaged with the inwardly projecting flange dividing the interior of the housing into two nonintercommunicating chambers, a body of thermally responsive expansible and contractible fluid confined in one of said chambers, a normally open valve member carried by the flexible diaphragm and projected into engagement with the valve seat surrounding the entrance to the vent passage upon deflection of the diaphragm incident to expansion of the confined charge of expansive fluid, the construction and arrangement being such that while the confined body of thermally responsive fluid is normally contracted, the valve member will be normally retracted away from its seat to maintain the vent passage open for escape of air entering the valve chamber through the tubular stem, and upon entrance of heated medium into said chamber and consequent expansion of said confined body of thermally responsive fluid, the deflection of the diaphragm incident thereto will close the vent passage to prevent the escape of heated steam or vapor by which the temperature of the confined body of thermally responsive material has been increased.

WILLIAM W. CARRON.

REFERENCES CITED

The following references are of record in the file of this patent:

UNITED STATES PATENTS

| Number | Name | Date |
|---|---|---|
| 1,123,480 | Buckelew | Jan. 5, 1915 |
| 1,921,915 | Fleming | Aug. 8, 1933 |
| 2,029,950 | Simpson | Feb. 4, 1936 |
| 2,095,506 | Leutwiler | Oct. 12, 1937 |

FOREIGN PATENTS

| Number | Country | Date |
|---|---|---|
| 25,858 | Great Britain | A. D. 1902 |